United States Patent Office 3,663,576
Patented May 16, 1972

---

3,663,576
WATER-SOLUBLE ANTHRAQUINONE DYESTUFFS
Fritz Meininger, Frankfurt am Main, Klaus Hunger, Kelkheim, Taunus, and Hartmut Springer, Frankfurt am Main, Germany, assignors to Farbwerke Hoechst Aktiengesellschaft vormals Meister Lucius & Bruning, Frankfurt am Main, Germany
No Drawing. Filed Aug. 6, 1969, Ser. No. 848,073
Claims priority, application Germany, Aug. 10, 1968, P 17 93 172.5
Int. Cl. C09b 1/34
U.S. Cl. 260—372       6 Claims

ABSTRACT OF THE DISCLOSURE

Water-soluble anthraquinone dyestuff having in form of the free acid formula

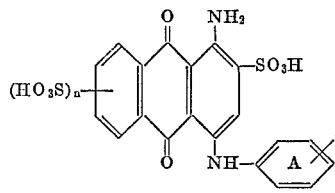

in which X represents a direct linkage, —$CH_2$—, —$CH_2CH_2$—, —NH— or —N(lower alkyl)—, the benzene nucleus is unsubstituted or substituted by hydrogen, methyl, lower alkoxy, carboxyl, chlorine or bromine, and n stands for 0 or 1, the said dyestuffs being suitable for the dyeing or printing of leather or of fibrous materials consisting of wool, silk, linear polyamides, native or regenerated cellulose fibres, the dyeings or prints obtained on said materials being distinguished by very good fastness properties to wetting and to light.

---

The present invention provides new, water-soluble anthraquinone dyestuffs which in the form of the free acid correspond to the formula

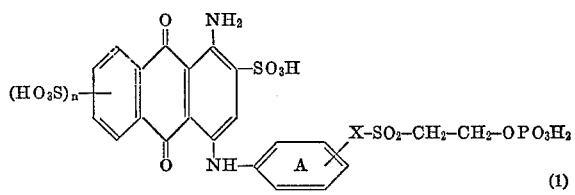

wherein X represents a direct linkage or the group —$CH_2$—, —$CH_2$—$CH_2$—, —NH— or —N(alkyl)—, n is zero or one and in which the benzene nucleus A may contain further substituents such as alkyl, alkoxy, carboxyl- and/or cyano groups and/or chlorine or bromine atoms.

The new anthraquinone dyestuffs of the above-identified general Formula 1 can be prepared (a) By reacting 4-bromo-1-amino-anthraquinone-sulfonic acids of Formula 2

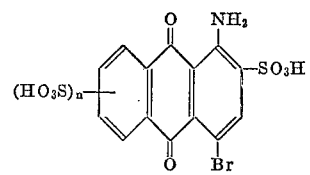

with primary amines of Formula 3

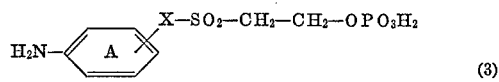

in which n, A and X are defined as above at temperatures between about 20° and about 100° C., preferably between about 50° and about 70° C. at pH values ranging from 7 to 11, advantageously in aqueous or aqueous-organic media, in the presence of acid-binding agents, preferably in the presence of catalysts such, for example, as monovalent copper salts and metallic copper, or (b) By converting anthraquinone compounds of the general Formula 4

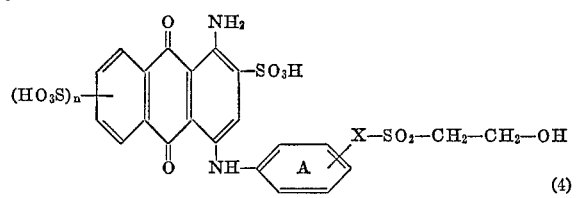

in which n, A and X have the meanings given above with phosphorylating agents in known manner into the corresponding phosphoric acid monoesters.

Suitable amines of Formula 3 are, for example, the phosphoric acid monoesters of the following compounds:

β-hydroxyethyl-(3-amino-phenyl)-sulfone,
β-hydroxyethyl-(4-amino-phenyl)-sulfone,
β-hydroxyethyl-(3-amino-4-methoxy-phenyl)-sulfone,
β-hydroxyethyl-(3-methoxy-4-amino-phenyl)-sulfone,
β-hydroxyethyl-(3-amino-4-methyl-phenyl)sulfone,
β-hydroxyethyl-(3-bromo-4-amino-phenyl)-sulfone,
β-hydroxyethyl-(3-amino-4-carboxy-phenyl)-sulfone,
β-hydroxyethyl-(2,5-dimethoxy-4-amino-phenyl)sulfone,
β-hydroxyethyl-(2-methyl-4-amino-5-methoxy-phenyl)-sulfone,
β-hydroxyethyl-(3-amino-4-methoxy-benzyl)-sulfone,
3-(N-methyl-N-isoethionylamino)-1-aminobenzene,
4-(N-methyl-N-isoethionylamino)-1-aminobenzene,
2-methoxy-4-(N-methyl-N-isoethionylamino)-1-aminobenzene and
3-(N-isoethionylamino)-1-aminobenzene.

The phosphoric acid monoesters mentioned can be obtained in known manner, for example, according to the methods disclosed in "Houbon-Weyl: Methoden der organischen Chemie," vol. 12/2. p. 147 et seq.

As suitable 4-bromo-1-amino-anthraquinone-sulfonic acids of the Formula 2 given above there may, for example, be named the following:

4-bromo-1-amino-anthraquinone-2,5-disulfonic acid,
4-bromo-1-amino-anthraquinone-2,6-disulfonic acid,
4-bromo-1-amino-anthraquinone-2,8-disulfonic acid and, in particular 4-bromo-1-amino-anthraquinone-2-sulfonic acid. Moreover, mixtures of said 4-bromo-1-amino-anthraquinone-sulfonic acids may be used.

Acid-binding agents suitable to be used according to method (a) are, for example, alkali metal carbonates or bicarbonates such as sodium or potassium carbonate or bicarbonate, disodium hydrophosphate, sodium acetate, tertiary organic bases such as pyridine, picoline, lutidine, triethyl amine or dimethylaniline.

In the reaction according to method (a) which proceeds aqueous-organic medium as organic solvents, for example lower mono- or polyvalent alcohols may serve such as methanol, ethanol, propanol, butanol or glycol, moreover, dimethylformamide, dimethylsulfoxide and pyridine.

It must be regarded as surprising that the reaction of the starting components of Formula 2 with the amines of Formula 3 according to method (a) yields the anthraquinone dyestuffs of the general Formula 1. The easy separability of phosphoric acid esters containing in the $\beta$-position a strongly electron-attracting substituent such, for example, as a phosphoric acid-mono-(cyano-alkyl-ester) suggested that the phosphoric acid ester group in the $\beta$-position of the amino components concerned is split off during the reaction with 4-bromo-1-amino-anthraquinone-sulfonic acids (cf. e.g. the data in "Houben Weyl" Methoden der organischen Chemie," vol. 12/2, p. 165). However, the reaction, surprisingly, proceeds without decomposition of the phosphoric acid ester group the new anthraquinone dyestuffs of the general Formula 1 being, usually, obtained in excellent yield.

As phosphorylating agents applicable according to method (b) there may, for example, be mentioned; concentrated phosphoric acid pyrophosphoric acid, metaphosphoric acid, polyphosphoric acid, alkylesters or acid alkylesters of condensated phosphoric acids, mixtures thereof with phosphorus pentoxide and phosphorus oxychloride.

The reaction of the anthraquinone compounds of the Formual 4 mentioned with phosphoric acid or with the condensated phosphoric acids cited or with alkylesters or acid alkylesters thereof is, advantageously, carried out at elevated temperatures, preferably between about 50° and 150° C., in an excess of phosphorylating agent which is to prevent the extent possible the formation of phosphoric acid diesters. It is also possible, to operate in the presence of inert solvents or diluents, for example, toluene, chlorobenzene or chloronaphthalene. In case condensated phosphoric acids or their alkylesters or acid alkylesters are used, it may be advantageous to subsequently subject the reaction mixture to hydrolysis under mild conditions, for example with hot water in order to convert the pyrophosphoric or polyphosphoric acid monoesters formed as by-products into phosphoric acid monoesters.

The reaction of the anthraquinone compounds of Formula 4 with phosphorus oxychloride is advantageously conducted with exclusion of moisture in excess phosphorus oxychloride while cooling or moderately heating, if desired, in the presence of a tertiary amine, for example pyridine, lutidine or dimethyl aniline and/or another solvent or diluent, for example benzene or chlorobenzene. It is advantageous to remove, continuously, the chlorohydrocarbon formed in the reaction by slightly evacuating the reaction vessel or by passing an inert gas through the reaction mixture. In the reaction with excess phosphorus oxychloride first phosphoric acid monoester dichlorides of the compounds of Formula 4 are formed which must be saponified subsequently in a second reaction step. The saponification suitably takes place, for example, in water, dilute acids or bases while cooling, at room temperature or while heating.

According to both methods described the new anthraquinone dyestuffs are isolated by salting out, for example by means of sodium chloride or potassium chloride and/or acidifying with an inorganic acid or by concentrating the aqueous neutral or weakly acid dyestuff solutions, preferably at a slightly elevated temperature, under reduced pressure.

The new anthaquinone dyestuffs of the invention are suited for dyeing or printing leather or fibrous materials, for example wool, silk, linear polyamides, especially materials containing hydroxyl groups having a fibrous structure, such as linen, regenerated cellulose or cotton.

The materials are dyed for example by direct-dyeing methods in an aqueous bath containing alkaline agents and, optionally, inorganic salts, for example alkali metal chlorides or alkali metal sulfates at room temperature or at elevated temperatures for example between about 50° and 100° C.

In case the dyestuffs have no or poor affinity to the fibre it is, advantageously, proceeded as follows: The fibrous material is impregnated with aqueous dyestuff solutions that may contain, optionally, alkaline agents and inorganic salts, in the cold or at moderate temperatures, squeezed off and the applied dyestuffs are fixed, if desired, after intermediate drying.

In case the padding liquor employed contains an alkaline agent, the subsequent fixation is effected, for example, by steaming, thermofixing or storing the impregnated material for several hours. The choice of the fixing method essentially depends upon the type and quantity of the alkaline agent used.

When impregnating baths not containing alkaline agents are used the impregnated fabrics are subsequently introduced first into a salt-containing alkaline bath subjecting them to one of the filtering procedures described above.

As alkaline agents alkali metal hydroxides, carbonates, bicarbonates, phosphates, borates or silicates or alkali metal salts of trichloroacetic acid or mixtures of said compounds are preferred.

For the application in the printing of textiles the new dyestuffs are dissolved in water, if desired, with addition of known auxiliaries, for example urea or dispersing agents and stirred with thickeners, for example, methyl cellulose or alginate thickeners. To the so-obtained pastes the mentioned alkalies are added and the goods are printed in known manner the material being then fixed by steaming or thermofixing in usual manner.

The fibrous materials can also be printed with neutral or weakly alkaline printing pastes not containing alkaline agents. In this case they are subjected prior to printing or subsequently thereto to treatment with alkaline agents, for example, slowly passed through a salt-containing alkaline solution and undergo, subsequently, one of the fixing processes described. However, the material can also be fixed in a very simple manner by passing it after printing through a hot alkaline salt-containing solution. Another way of accomplishing the fixation in a very simple manner consists in passing the printed material through a hot salt-containing alkaline solution.

The new dyestuffs yield on the materials mentioned deep dyeings and prints exhibiting very good fastness to light and to wet processing.

In comparison with the dyestuffs disclosed in German Pats. 965,902 and 1,154,892 having the most closely related structure, the new anthraquinone dyestuffs possess better solubility. They are, above all, superior with respect to stability of the alkaline dyebaths and printing pastes.

The following examples illustrate the invention but they are not intended to limit it thereto, the parts and percentages being by weight unless otherwise stated.

EXAMPLE 1

129 parts of 4-bromo-1-amino-anthraquinone-2-sulfonic acid of 81.3% strength were mixed with 1.85 parts of copper (I)-chloride and 0.6 part of pulverized copper and a solution of 73.5 parts of $\beta$-hydroxyethyl-(3-aminophenyl)-sulfone phosphoric acid monoester in 250 parts of water neutralized with 22 parts of sodium carbonate was added thereto. Thereupon, 84 parts of sodium hydrocarbonate were introduced and the batch was stirred for several hours at 65° C. while passing nitrogen through the mixture which was subsequently diluted with 1000 parts of water, weakly acidified with hydrochloric acid, filtered and evaporated to dryness in vacuo.

The dyestuff obtained was a blue powder that showed excellent hydrosolubility and resistance to alkalies. It yielded in the presence of alkalies, for example of sodium carbonate or sodium hydroxide on native or regenerated cellulose deep brilliant blue dyeings and prints displaying good to very good fastness to light and wet processing.

EXAMPLE 2

46.6 parts of β-hydroxyethyl-(3-amino-4-methoxyphenyl)-sulfone phosphoric acid ester in 150 parts of water were dissolved neutral with 19 parts of sodium hydrocarbonate. The solution was stirred with 77.5 parts of 4-bromo-1-amino-anthraquinone-2-sulfonic acid of 81.3% strength, 1.15 parts of copper (I)-chloride and 0.38 part of pulverized copper. After 50.4 parts of sodium hydrocarbonate had been added, stirring was continued for one hour at 20° C. heating, subsequently, the batch to 65° C. at which temperature it was kept for 20 hours. Thereupon, it was diluted with 500 parts of water, weakly acidified with 2 N hydrochloric acid and filtered. The filter cake was washed with a sodium chloride solution of 10% strength having a temperature of 50° to 80° C. until the filtrate had become colorless and dried, subsequently in vacuo at 50°–60° C.

The so-obtained product was a blue powder dissolving in water while giving a blue colour. The dyestuff yielded on cotton in the presence of sodium hydroxide blue dyeings having very good fastness to light and wet processing.

EXAMPLE 3

42 parts of β-hydroxyethyl-(4-amino-phenyl)-sulfone phosphoric acid ester in 150 parts of water were neutralized with sodium hydrocarbonate and were dissolved. The solution was stirred for one hour with 63 parts of sodium hydrocarbonate, 70.5 parts of 4-bromo-1-amino-anthraquinone-2-sulfonic acid, 0.9 part of copper(I)-chloride and 0.3 part of pulverized copper at 20° C. heating them within 3 hours to 65% C. at which temperature it was kept for 22 hours. The reaction proceeded under an atmosphere of inert gas, for example nitrogen, with stirring. After cooling, 300 parts by volume of 2 N hydrochloric acid were added, it was filtered and the filtrate was mixed with potassium chloride, the product filtered and dried. 147 parts of a blue saliferous powder were obtained containing as potassium salt the dyestuff of formula

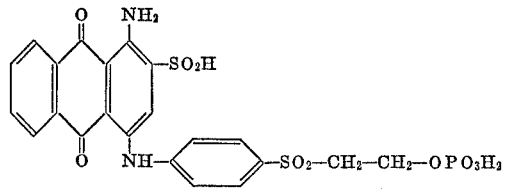

which yielded on cotton fabrics in the presence of alkaline agents blue dyeings showing very good fastness to light, rubbing and wet processing.

EXAMPLE 4

10 parts of the dyestuff of formula

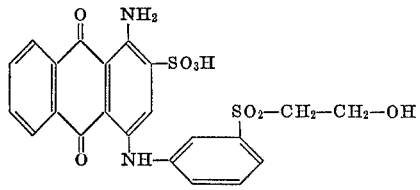

were introduced with thorough stirring into 50 parts of pyrophosphoric acid, stirring was continued for one hour at 100° C., the batch was allowed to cool to 80° C., 75 parts of water were slowly added dropwise while maintaining the temperature between 80° and 100° C. and the reaction mixture was subsequently refluxed for one hour. After cooling to room temperature, the batch was diluted with 120 parts of saturated sodium chloride solution, the precipitated dyestuff filtered off and washed with sodium chloride solution. The moist filter residue was stirred with 100 parts of water and sodium bicarbonate was added until the pH had reached a value of 4.5. The clear solution obtained was concentrated in vacuo at 40° C. 13 parts of a saliferous dyestuff were obtained which in the form of the free acid corresponded to the formula

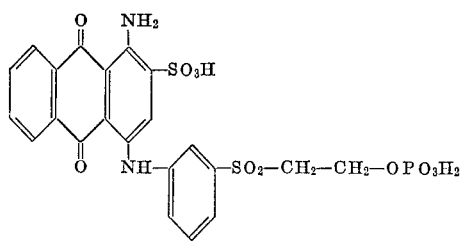

The dyestuff was excellently soluble in water. It yielded when used according to known dyeing methods for reactive dyestuffs brilliant blue dyeings, showed good resistance in alkaline dyeing baths. Due to the very good stability of its alkaline-rendered printing pastes, it was highly suitable also as printing dyestuff.

The same dyestuff was obtained when in the process described above instead of 50 parts of pyrophosphoric acid an equivalent amount of polyprosphoric acid (84%–85% of $P_2O_5$) was used.

The same dyestuff was obtained, when in the preceding example instead of 50 parts of pyrophosphoric acid an equivalent amount of acid polyphosphoric acid methyl ester having a $P_2O_5$ content of 76.8% and a methyl content of 1.5% was used, the reaction mixture was heated to 130–135° C. during two hours instead of heating for one hour to 100° C. the remaining procedure being analogous.

EXAMPLE 5

55.2 parts of the dyestuff of formula

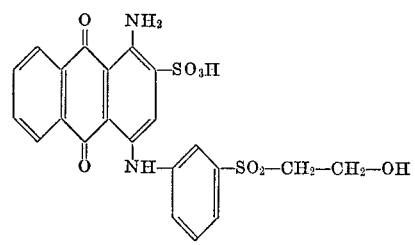

were heated to 70°–75° C. for 3 to 4 hours with 200 parts of phosphorus oxychloride while passing nitrogen through the mixture and vigorously stirring. After cooling the reaction mixture, the excess phosphorus oxychloride was distilled off in vacuo and the residue was diluted with about 150 parts by volume of iced water, whereupon the pH was adjusted to 6.5–7.00 by means of saturated sodium carbonate solution and the solution was filtered over kieselguhr. After another acidification up to a pH of 5 and after salting out with potassium chloride 83 parts of a saliferous dyestuff were obtained which in the form of the free acid corresponded to the formula

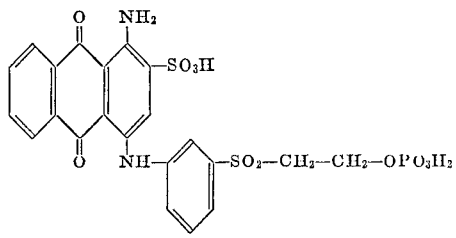

and was identical with the dyestuff obtained according to Example 4.

The following table lists further components from which the corresponding dyestuffs may be obtained according to the preceding examples by reacting the anthraquinone compounds of column I with an amino compound of column II always or with the phosphorylating agents in column III. The last column specifies the shades produced with the so-obtained dyestuffs on cellulose fabrics.

| I | II | III | Shade on cellulose fabrics |
|---|----|-----|------|
| (anthraquinone with NH₂, SO₃H, NH–C₆H₃(SO₂–CH₂–CH₂–OH)(COOH)) | — | Pyrophosphoric acid. | Blue. |
| (anthraquinone with NH₂, SO₃H, NH–C₆H₃(SO₂–CH₂–CH₂–OH)(Cl)) | — | do. | Do. |
| (anthraquinone with HO₃S–, NH₂, SO₃H, NH–C₆H₃(SO₂–CH₂–CH₂–OH)(Cl)) | — | do. | Do. |
| (anthraquinone with NH₂, SO₃H, Br) | NH₂–C₆H₄–N(CH₃)–SO₂–CH₂–CH₂–O–PO₃H₂ | — | Do. |
| (anthraquinone with NH₂, SO₃H, Br) | NH₂–C₆H₄–NH–SO₂–CH₂–CH₂–O–PO₃H₂ | — | Do. |
| (anthraquinone with NH₂, SO₃H, NH–C₆H₄–CH₂–SO₂–CH₂–CH₂–OH) | — | Pyrophosphoric acid. | Do. |
| (anthraquinone with NH₂, SO₃H, Br) | NH₂–C₆H₄–CH₂–CH₂–SO₂–CH₂–CH₂–O–PO₃H₂ | — | Do. |

| I | II | III | Shade on cellulose fabrics |
|---|---|---|---|
| ![anthraquinone with SO3H and Fr] | ![aniline with CH3, SO2-CH2-CH2-O-PO3H2] | | Blue. |
| Same as above | ![aniline with Br, SO2-CH2-CH2-O-PO3H2] | | Do. |

EXAMPLE 6

23.5 parts of 1-amino-4-bromoanthraquinone-2,6-disulfonic acid were introduced together with 21 parts of sodium hydrocarbonate, 0.3 part of copper(I)-chloride and 0.1 part of pulverized copper into a solution of 18.9 parts of β-hydroxyethyl-(3-aminophenyl)-sulfone phosphoric acid monoester in 150 parts by volume of water neutralized with sodium hydrocarbonate. The whole was stirred for one hour at room temperature, the temperature was allowed to rise to 65° C. within 3 hours and maintained so for several hours. After stirring for 48 hours at room temperature, 100 parts by volume of water were added whereupon a pH of 6 was adjusted with 120 parts by volume of 2 N hydrochloric acid, it was filtered and the filtrate was concentrated in vacuo. 59 parts of saliferous dyestuff were obtained which in the form of the free acid corresponded to the formula

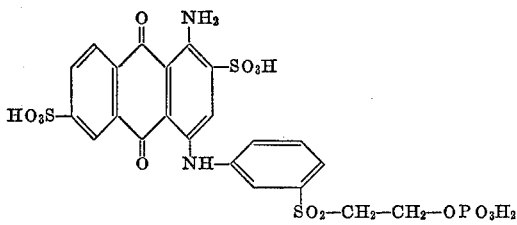

and yielded on cotton fabrics in the presence of sodium carbonate prints of excellent fastness to light and wet processing.

EXAMPLE 7

21.5 parts of the phosphoric acid monoester of 4-(N-methyl - N - isoethionylamino)-1-aminobenzene were dissolved neutral in 150 parts by volume of water with 6 parts of hodium hydrocarbonate. The solution was stirred for one hour at 20° C. with 23.5 parts of 1-amino-4-bromo-anthraquinone-2-sulfonic acid, 0.1 part of pulverized copper, 0.3 part of copper(I)-chloride and 21 parts of sodium hydrocarbonate, heated, subsequently, within 3 hours to 65° C. at which temperature it was maintained for 22 hours. After cooling, the whole was diluted with 200 parts by volume of water, adjusted to a pH of 6 by means of 2 N hydrochloric acid, filtered and the solution was concentrated. 49 parts of a saliferous dyestuff were obtained which in the form of the free acid corresponded to the formula

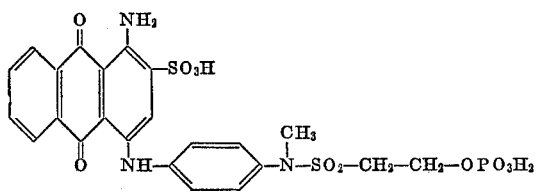

and yielded on cotton fabrics in the presence of sodium carbonate clear blue prints having good fastness to wet processing.

We claim:
1. A water-soluble anthraquinone dyestuff having in form of the free acid the formula

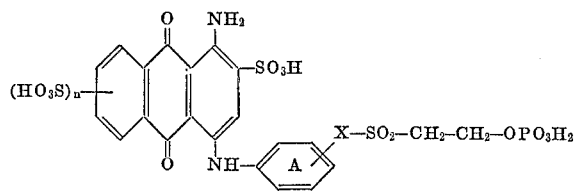

wherein X is a direct linkage, —CH₂—, —CH₂—CH₂—, —NH— or —N (lower alkyl)-, the benzene nucleus A is unsubstituted or substituted by methyl, lower alkoxy, carboxyl, chlorine or bromine, and $n$ stands for 0 or 1.

2. The dyestuff of the formula

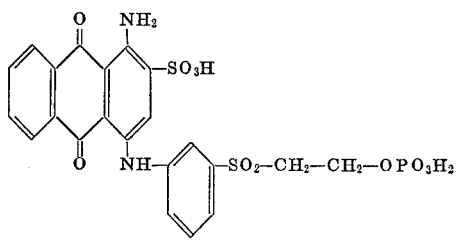

3. The dyestuff of the formula

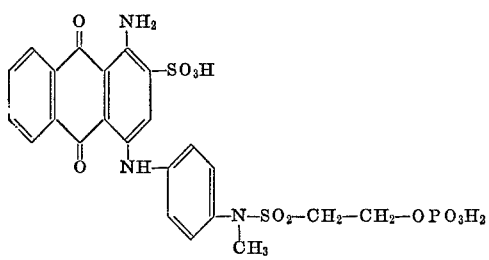

4. The dyestuff of the formula
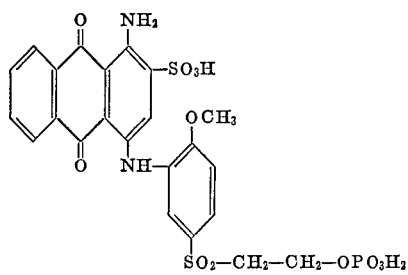
5. The dyestuff of the formula
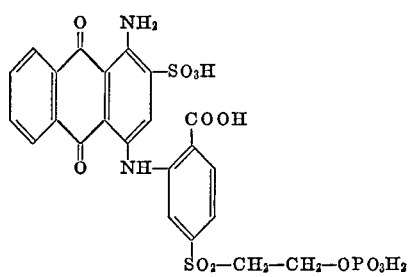
6. The dyestuff of the formula
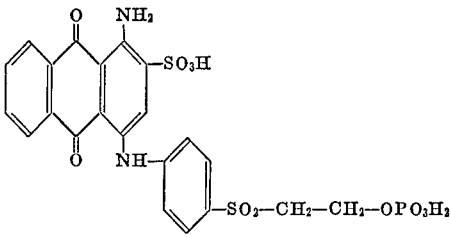
References Cited
UNITED STATES PATENTS
| | | | |
|---|---|---|---|
| 3,324,151 | 6/1967 | Kühne et al. | 260—374 |
| 3,372,170 | 3/1968 | Remy | 260—374 |
| 3,294,778 | 12/1966 | Randall et al. | 260—374 |
| 2,311,065 | 2/1943 | McNally et al. | 260—380 |
FOREIGN PATENTS
1,010,999  11/1965  Great Britain _____ 260—374
LORRAINE A. WEINBERGER, Primary Examiner
E. J. SKELLY, Assistant Examiner
U.S. Cl. X.R.
8—39, 40; 260—374